No. 630,591. Patented Aug. 8, 1899.
W. S. CASE.
CAN SOLDERING APPARATUS.
(Application filed Jan. 26, 1898.)
(No Model.)

Witnesses,

Inventor,
Wilmer S. Case
By Dewey Strong & Co.
Atty

UNITED STATES PATENT OFFICE.

WILMER S. CASE, OF SAN JOSÉ, CALIFORNIA.

CAN-SOLDERING APPARATUS.

SPECIFICATION forming part of Letters Patent No. 630,591, dated August 8, 1899.

Application filed January 26, 1898. Serial No. 668,065. (No model.)

*To all whom it may concern:*

Be it known that I, WILMER S. CASE, a citizen of the United States, residing at San José, county of Santa Clara, State of California, have invented an Improvement in Can-Soldering Apparatus; and I hereby declare the following to be a full, clear, and exact description of the same.

My invention relates to an apparatus which is especially designed for soldering square, oval, or polygonal cans generally on lines where the heads and sides are joined.

It consists of mechanism whereby the square cans are delivered from the feed or supply chute to holders and by these holders transferred, so that the edges to be soldered will be caused to traverse a solder-bath, and mechanism whereby the cans are rotated at stated intervals to submerge the edges to be soldered within the bath.

It also comprises details of construction, which will be more fully explained by reference to the accompanying drawings, in which—

Figure 1:
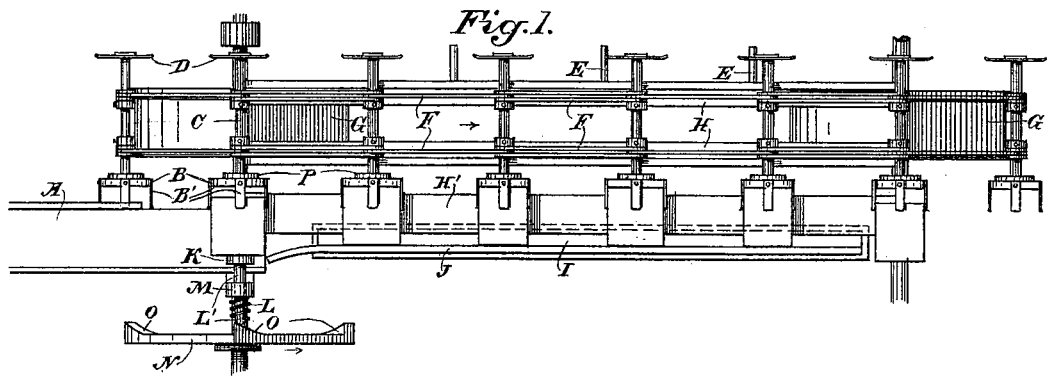
Figure 2:
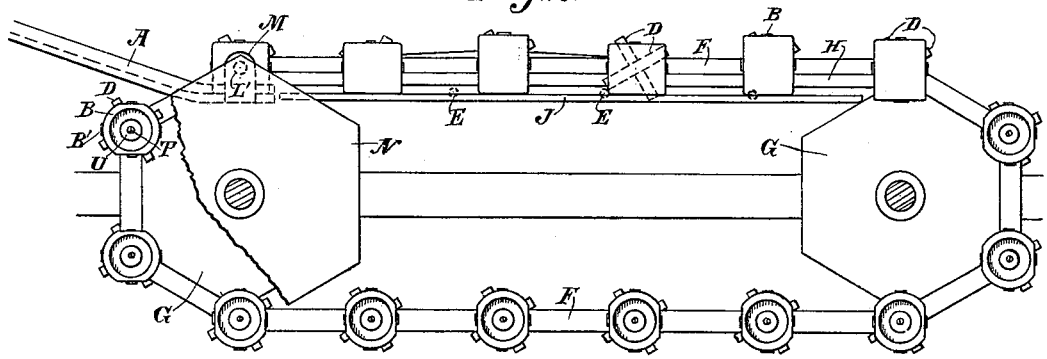
Figure 4:
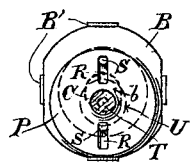
Figure 3:
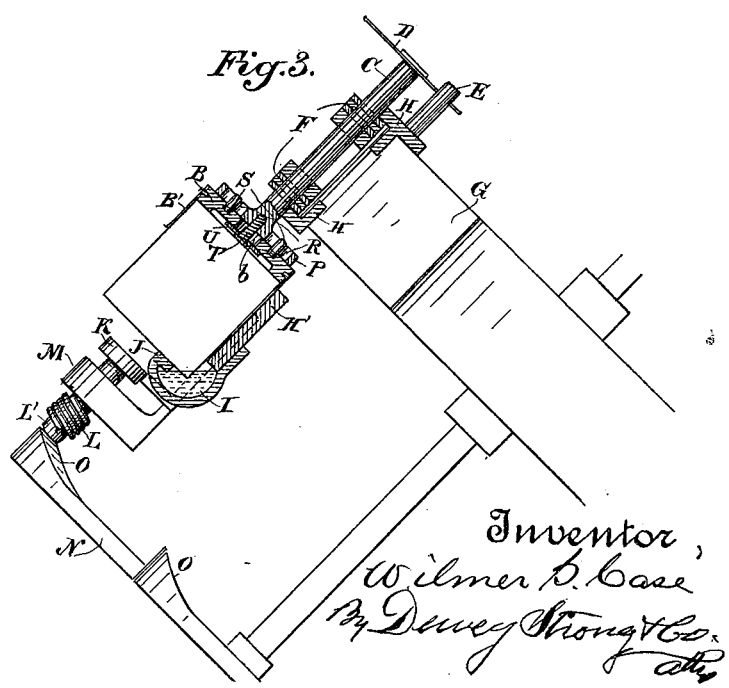

Figure 1 is a top view of my apparatus, shown in a horizontal plan. Fig. 2 is an edge view of the same. Fig. 3 is a section through the apparatus. Fig. 4 is a top view of a holder or carrier.

In the soldering of square or polygonal cans it is necessary to turn the cans intermittently, so as to submerge the edges in the solder long enough to allow the solder to soak into the joint, and to automatically turn the cans, so as to present each successive edge for the action of the solder before the can is finally discharged from the apparatus.

The cans are brought to the apparatus through an inclined chute A, which delivers them at a point essentially in line with the carrier B. This carrier consists of a base-plate suitably shaped and having projecting fingers B', between which the can is held during its progress through the remainder of the apparatus. The carrier is connected with a shaft C, by which it is moved in a manner to be hereinafter described. This shaft C has upon its outer end a star-wheel D and the shaft itself is journaled upon a chain F, which passes around suitable polygonal drums G at each end, power being applied to rotate the drums and cause the chain to travel. The chain F has as many of the carriers B fixed to it as can be conveniently employed and suitably spaced with relation to the chain, each shaft being journaled, as before described, upon the chain. A fixed framework H carries studs E, suitably spaced, and the points of the star-wheels D contacting with those studs at intervals will turn the shaft and with it the can-carrier and the contained can.

The solder-trough I is of any suitable dimensions and length and is so situated that the can held in its carrier with one side resting upon the support H' will have the bottom abutting against a bar J, which extends longitudinally with relation to the solder-trough, so that when the can is resting upon this bar the lower edge will dip into the solder in the trough. This bar J is so arranged that its end adjacent to the chute A is diverged so as to receive the end of the cans when they have been fitted into the carrier. The cans are introduced to the carrier by means of a plunger K, which is normally held down by a spring L, surrounding the plunger-shaft. This shaft is slidable in a yoke M, and the periphery of a disk N turns in line beneath the end of a stem L'. Upon this disk are beveled or cam-shaped projections O, which when the disk is rotated are successively moved beneath the stem L of the plunger K, and the plunger will thus be temporarily forced upward until the end of the stem has passed over the highest end of the cam, when the spring L will retract it. This operation of raising the plunger takes place at the instant when the can has been presented in line with the plunger and when the carrier B has at the same instant appeared in line with the can, so that when the plunger is thus forced forward it forces the can between the arms B' of the carrier, and the lower end of the can will thus pass above the outwardly-curved bar J as the chain moves the carrier along toward the solder-bath. This insures the can being properly seated within the carrier, and as it thereafter rests upon the bar J it will not fall out of the carrier by reason of the arms B' not clasping it sufficiently to hold it.

The carrier-chain may be made of such length as to allow all of the edges of the article to be soldered to be successively brought into the solder-bath before being discharged from the apparatus, and there are as many of the projecting lugs E as are necessary to turn the can to present its whole periphery for soldering.

For soldering irregularly-shaped oval or square cans it will be seen that some provision must be made for allowing the can to turn about the axis of the shaft C, so as to compensate for the different distances from the center to the sides and to the angles of the can. This is effected by connecting the can-carrier B with the disk P, which is fixed upon the end of the shaft C. The disk is slotted transversely, as shown at R, and pins S upon the back of the carrier project into these slots. The carrier-head itself has a central opening $b$ of sufficient diameter to allow it to move with relation to the shaft and disk, and this plus the flexibility of the belt compensates for the difference in the distance between the center and the angle of the can when the latter is turning. The carrier is loosely secured to the disk by means of a screw T, passing through a disk or washer U, which lies in a depression in the carrier-disk P, and when it has been attached by the screw, so as to loosely hold the head B to the disk P, it allows the head to move transversely upon the disk whenever the arms D of the star encounter one of the stops E, by which the shaft and the disk and carrier are turned. The chain is driven by any suitably-applied power, and the cans being delivered from the chute A are forced into the arms B' of the carrier, and the whole apparatus standing at an angle, as shown, the sides of the cans rest upon the bar H' of the frame, the lower end resting upon the bar J, so that the angular edge of the can dips into the melted solder of the trough I. When the can has been turned so that the edge is in this position, it moves along until the star D strikes the next of the pins E, when the can will be turned about its forward angle, and by the construction previously shown the carrier will slide with relation to the disk so as to allow the can to turn properly until the next side is submerged in the solder. The can will remain for an instant in this position, while the shaft and disk move with relation to the carrier on account of the opening $b$ and the slots R, and the whole will then slide along until the next turning-pin is reached. In this manner any irregular form of can may have its angular edges soldered automatically. When the cans reach the end of the bath, they are discharged from the carrier by gravitation, which acts as soon as the can has passed beyond the supporting-bar J.

Having thus described my invention, what I claim as new, and desire to secure by Letters Patent, is—

1. The combination of a can-carrier, an endless traveling belt, a shaft journaled upon said belt, a means for periodically turning said shaft as it travels, a mechanism intermediate between the shaft and the carrier whereby the latter is allowed to move transversely with relation to the shaft to allow the turning of an irregularly-shaped can, and a solder-bath into which the angular edges of such can are successively submerged.

2. An apparatus for soldering rectangular and irregularly-shaped cans, consisting of an endless traveling belt, shafts journaled transversely upon said belt, arms projecting from one end of the shaft and lugs or projections with which they periodically engage whereby the shaft is turned a portion of a revolution with each engagement, a carrier having clasps for holding the can, the sides of which correspond with the number of arms of the turning device, a transversely-slotted disk fixed to the end of the shaft, and a means for attaching the carrier-head loosely to said disk whereby it is movable radially with relation thereto, to allow the can to turn upon a supporting-surface about its angles.

3. An apparatus for soldering rectangular and irregularly-shaped cans, consisting of an endless traveling belt, shafts journaled transversely upon said belt, arms projecting from one end of the shaft and lugs or projections with which they periodically engage whereby the shaft is turned a portion of a revolution with each engagement, a carrier having clasps for holding the can, the sides of which correspond with the number of arms of the turning device, a transversely-slotted disk fixed to the end of the shaft, pins projecting from the carrier-head and slidable in the slots, and a means for attaching the carrier-head loosely to said disk whereby it is movable radially with relation thereto, to allow the can to turn upon a supporting-surface about its angles.

4. A device for soldering angular cans consisting of a trough for melted solder, a framework fixed diagonally with relation to the trough having a support upon which the sides of the cans rest and turn at intervals, a second support against which the bottom of the can rests so that the angular edges may be submerged in the solder, a device for moving and turning the cans consisting of an endless traveling chain, shafts journaled transversely of the chain and in line with the axis of the cans, arms fixed to the upper ends of the shafts and fixed stationary lugs with which said arms engage successively as the chain travels, whereby the shaft is turned at intervals, a transversely-slotted disk fixed to the lower end of the shaft, a carrier-head loosely attached to said disk and movable radially with relation thereto, arms projecting from said head between which a can is clasped, the movements of said head upon the disk allowing the angular can to turn so as to successively submerge its edges in the solder-bath by the action of the traveling carrier.

5. In an angular can-soldering apparatus, the combination, of an endless traveling and rotatable holder, having clasps between which one end of the can is received, a chute through which the cans are brought to a point in line with the holder, a plunger, the stem of which is in direct alinement with the rotatable holder and the can positioned in the chute, said plunger to engage the opposite end of the can, and means whereby said plunger is operated simultaneously with the alinement of the holder with the can.

6. In an angular can-soldering apparatus, the combination, of an endless traveling, rotatable carrier having arms projecting therefrom, and adapted to receive one end of the can, a chute for successively bringing the cans into line with the carrier, a slidably-mounted plunger, the stem of which is in direct alinement with the rotatable holder and the can positioned in the chute, said plunger to engage the opposite end of the can, and a rotary disk or wheel having cams adapted to engage the plunger-stem when the can and holder are alined whereby the can is forced endwise into the holder.

In witness whereof I have hereunto set my hand.

WILMER S. CASE.

Witnesses:
S. H. NOURSE,
JESSIE C. BRODIE.